Aug. 1, 1939.    H. J. KANE    2,168,126
PIPE VISE
Filed Sept. 11, 1937
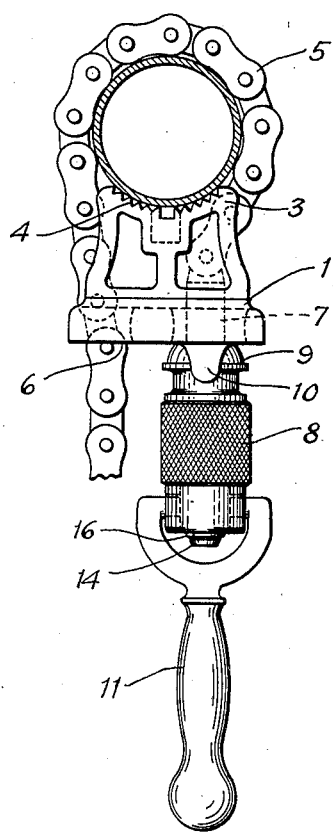
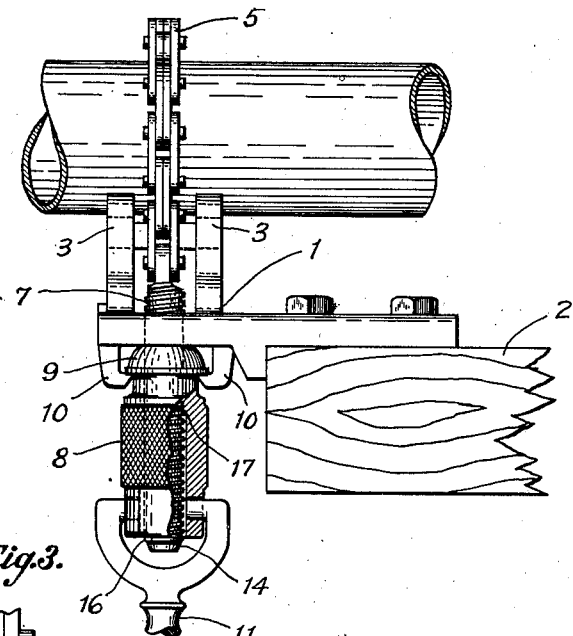
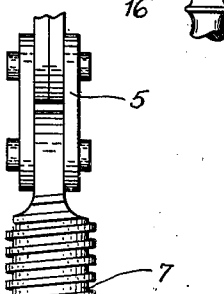
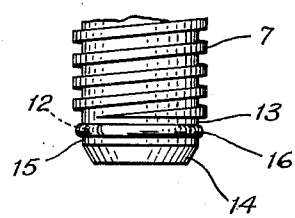
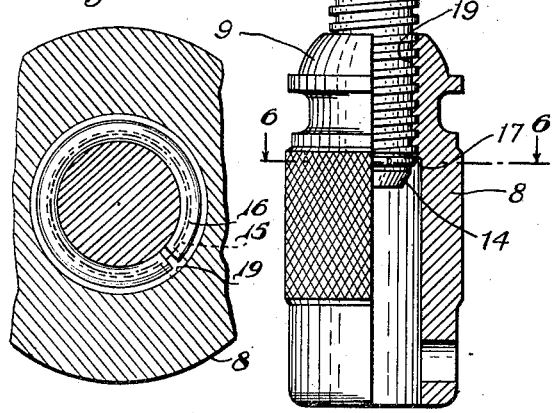
INVENTOR:
HENRY J. KANE
By
ATTORNEY.

Patented Aug. 1, 1939

2,168,126

UNITED STATES PATENT OFFICE 2,168,126

PIPE VISE

Henry J. Kane, New Britain, Conn., assignor to The Billings & Spencer Company, a corporation of Connecticut Application September 11, 1937, Serial No. 163,365

3 Claims. (Cl. 81—19)

My invention relates to pipe vises.

It has for its object to provide an improved pipe vise having improved nut and screw connecting parts which, irrespective of how the nut is spun, are so constructed as not to become accidentally detached when the vise is in use. A further object of my invention is to provide an improved pipe vise of the chain type having improved nut and screw connecting means whereby, while obtaining the above advantages, these connecting means may be quickly assembled or connected and also quickly removed whenever desired. These and other objects and advantages of my improved construction will, however, hereinafter more fully appear.

In the accompanying drawing, I have shown for purposes of illustration, one embodiment which my invention may assume in practice.

In the drawing—

Figure 1 is an end elevation of a pipe vise equipped with my improvement, the vise being shown in clamping position;

Figure 2 is a side elevation of the pipe vise, the same being shown as mounted on a plank or bench and having the tightening nut broken away;

Figure 3 is an enlarged detail view of the screw and the nut, the nut being shown partially in section to facilitate illustration;

Figure 4 is an enlarged detail view of the free end of the screw, showing a locking ring assembled with the screw;

Figure 5 is a view of the locking ring, and

Figure 6 is an enlarged sectional view on line 6—6 of Figure 3 showing the ring 16 in its normal position and in its fully expanded position when within the nut.

In this illustrative construction I have shown a pipe vise comprising a base 1 mounted on the edge of a plank or bench 2 and having stationary spaced jaws 3 provided with teeth 4 thereon adapted to support and grip a pipe. The pipe is grasped, in the usual manner of chain type pipe vises, by an overlying chain 5 having one end suitably hooked over an abutment 6 on the base and its other end connected through a threaded swivel connection or screw 7 to an adjusting nut 8, internally threaded on the screw 7 and having its upper end 9 carried on usual supports 10 on the base 1, while the nut also carries a usual handle 11. The swivel connection 7 is, herein, of an improved construction hereinafter more particularly described and carries improved means cooperating in a new manner with the nut 8.

As shown, the swivel connection or screw 7 is provided at the end opposite the swivel, with an annular groove 12 which is milled, or otherwise formed in a portion 13 just before the beginning of the threads. It is preferred to chamfer the end of the screw 7, as at 14, so as to leave only a narrow area 15, of the full diameter of the portion 13, between the groove 12 and the end of the screw. Over this narrow area 15 and into the groove 12 there is snapped in my improved construction, a split ring 16 preferably of spring wire having a relatively high resistance to being spread, this split ring 16 serving as a stop for the nut 8 and to prevent the same from becoming separated from the swivel connection 7. More particularly, when the nut 8 is in the position shown in Fig. 3, the ring 16 abuts against a shoulder 17 at the inner tapped end of an elongated opening 19 in the nut 8 which opens below the tapped portion thereof, and is of slightly greater diameter than the spring 16. Thus, the nut cannot be lowered beyond the position shown in Figure 3 when the locking ring is in place in its groove 12. Further, the ring 16 being disposed in the opening 19 whenever the screw is fed up from the position shown in Figures 1 and 2 into work releasing position, it is impossible for the ring 16 to be forced down or expanded by engagement with the shoulder 17 in such manner as to release the ring 16.

As a result of this improved construction, it will be noted that the nut 8 will always be kept in threaded engagement with the screw 7 and that, due to the enclosure of the ring 16 within the opening 19 the chain 5 may be released quickly by spinning the nut as quickly or hard as desired without any danger of spinning off the latter as a result of releasing the ring 16. Further, it will be noted that the ring 16 not only prevents loss of the nut 8 at anytime but thereby eliminates the loss of time required to rethread the nut on the screw whenever the nut becomes unthreaded from the member 7. Attention is also directed to the fact that the ring 16 may be readily assembled, and also be readily removed whenever it is required to take off the nut 8, the ring being both easily snapped on over the surface 14 and also being easily removed from the groove when desired, while also being readily accessible for assembly or removal, whenever the parts are in the position shown in Figures 1 and 2. These and other objects and advantages of my improved construction will, however, be clearly apparent to those skilled in the art.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In combination with a work gripping mechanism, a screw for operating the same, a nut threaded on said screw, stop means removably carried on the periphery of said screw adjacent the free end thereof and engageable by said nut, and means carried by said nut and engageable by the periphery of said stop means as a result of forces exerted by the longitudinal engagement of said nut and stop means for holding said stop means against longitudinal separation from said screw upon longitudinal engagement of said stop means and nut when unscrewing the latter.

2. In combination with a work gripping mechanism, a screw for operating the same having a groove adjacent the free end thereof, an adjusting member cooperating with said screw having a nut portion threadable on said screw and a sleeve portion having a bore of greater diameter than the bore of said nut portion, and a ring in said groove receivable in and having its periphery engageable with the enlarged bore of said sleeve portion as a result of forces exerted thereon by said adjusting member, said ring when in said enlarged bore being engageable with said nut portion when the latter is unscrewed to form a stop for said member.

3. Pipe vise operating mechanism including a screw for operating the vise having an annular groove formed in the surface of said screw at the beginning of the thread, a chamfered end on the screw adjacent the groove, a nut on said screw having threads coperating with the threads on the screw and having an opening communicating with the lower end of the threaded portion, the inner end of said opening forming a shoulder adjacent to the lower end of the threaded portion of the nut, and a ring expansible to pass over said chamfered end portion and fitting into said groove and cooperating with the shoulder and engageable with the side walls of said opening to act as a stop for said nut.

HENRY J. KANE.